(12) United States Patent
Bogoni et al.

(10) Patent No.: US 7,869,107 B2
(45) Date of Patent: Jan. 11, 2011

(54) OPTICAL CIRCUIT FOR COMPARING TWO N-BIT BINARY WORDS

(75) Inventors: Antonella Bogoni, Montova (IT); Luca Poti, Pisa (IT); Mirco Scaffardi, Parma (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 336 days.

(21) Appl. No.: 12/183,662

(22) Filed: Jul. 31, 2008

(65) Prior Publication Data

US 2009/0059331 A1 Mar. 5, 2009

(30) Foreign Application Priority Data

Jul. 31, 2007 (EP) ................ PCT/EP2007/057886

(51) Int. Cl.
 *G02F 3/00* (2006.01)
(52) U.S. Cl. ..................................... 359/108
(58) Field of Classification Search ................ 359/107, 359/108

See application file for complete search history.

(56) References Cited

U.S. PATENT DOCUMENTS

| | | | |
|---|---|---|---|
| 4,864,524 A | 9/1989 | Guilfoyle et al. | |
| 6,275,311 B1 | 8/2001 | Boffi et al. | |
| 6,462,865 B1 | 10/2002 | Chu et al. | |
| 6,731,648 B1 * | 5/2004 | Cotter | 370/458 |
| 7,248,400 B2 * | 7/2007 | Byun et al. | 359/344 |
| 2003/0058527 A1 | 3/2003 | Kim et al. | |

FOREIGN PATENT DOCUMENTS

JP 03216727 9/1991

OTHER PUBLICATIONS

Berrettini, G. et al. "Ultrafast Integrable and Reconfigurable XNOR, and, NOR and NOT Photonic Logic Gate." IEEE Photonics Technology Letters, vol. 18, No. 8, Apr. 15, 2006, pp. 917-919.

Yasui, T. et al. "Ultrafast All-Optical Pattern Matching Using Differential Spin Excitation and Its Application to Bypass/Drop Self-Routing for Asynchronous Optical Packets." Journal of Lightwave Technology, vol. 24, No. 2, Feb. 2006, pp. 723-733.

(Continued)

*Primary Examiner*—Alessandro Amari
*Assistant Examiner*—Jennifer L. Doak
(74) *Attorney, Agent, or Firm*—Coats & Bennett, P.L.L.C.

(57) ABSTRACT

An optical comparator circuit includes a first stage including an optical gate which receives the signals applied to the two inputs and produces at its output an N bit signal with each bit being representative of the logical expression A XOR B for a respective pair of bits of the words A and B, a second stage which comprises an optical gate having at least two inputs, a first input being connected to the output of the first stage by an optical connection having a first time delay, and a second input being connected to the output of the first stage through (N−1) further optical connections, each further connection having a different associated time delay which is longer than the first time delay.

21 Claims, 5 Drawing Sheets

OTHER PUBLICATIONS

Martinez, J. M. et al. "All-Optical Address Recognition Scheme for Label-Swapping Networks." IEEE Photonics Technology Letters, vol. 18, No. 1, Jan. 1, 2006, pp. 151-153.

Li, C. Y. et al. "Deflection Routing in Slotted Self-Routing Networks with Arbitrary Topology." 2002 IEEE International Conference on Communications (ICC 2002), vol. 5, 2002, pp. 2781-2785.

* cited by examiner

| $L_p$ (X) | $H_p$ (Y) | CW | OUTPUT |
|---|---|---|---|
| 0 | 0 | 1 | 0 |
| 1 | 0 | 1 | 1 |
| 0 | 1 | 1 | 0 |
| 1 | 1 | 1 | 0 |

OPTICAL CIRCUIT FOR COMPARING TWO N-BIT BINARY WORDS

CROSS REFERENCE TO RELATED APPLICATIONS

This application claims priority from PCT application PCT/EP2007/057886 entitled, "Optical Circuit for Comparing Two N-Bit Binary Words." That application was filed on Jul. 31, 2007 and is incorporated herein by reference in its entirety.

BACKGROUND TO THE INVENTION

This invention relates to improvements in optical circuits and in particular to an N-bit optical comparator for comparing two N-bit binary words. The comparator is especially suitable for use as a building block in a larger optical circuit, such as an all optical telecommunications switch.

N-bit comparators compare two N-bit binary words A and B, where N is greater than 1, and provide as an output at least one of the Boolean functions: A<B, A>B and at least one of NOT (A=B) and A=B. A fully functioned comparator will provide all of these signals as its three outputs. Each signal may take the form of a one bit Boolean signal indicating whether the logical/Boolean function represented by the signal is true or false (e.g. A<B is true or A>B is false). The values true and false can be coded 1 and 0 respectively.

Traditionally comparators for use in high performance computing systems and communications networks have been constructed using discrete digital electronic circuits, with the two words A and B comprising electronic signals and the outputs also comprising electronic signals. A four bit Boolean word can be expressed as a sequence of four binary digits. The circuit can be constructed using a wide variety of small electronic logic circuits, so called "logic gates" which embody Boolean functions such as AND, OR, and NOT. More complex Boolean expressions such as XOR and NAND can be constructed by combining the simpler gates into larger circuits. As the field of digital logic is well established these gates are available at very low costs making the circuits highly economical to produce.

A limitation with digital electronics arises when they are required to process signals at very high speeds. Whilst the logic gates can change state quickly they cannot meet the high speed demands required from modern telecommunications equipment. Whereas telecommunications once only transmitted low bandwidth voice data, it is now required to transmit video information which requires much greater bandwidth. Electronic devices are reaching fundamental limits at these high bandwidths in terms of their power consumption, wiring density and throughput.

Recent trends have seen computing systems and communications with ultra high bandwidths, approaching 160 GB per second or more, being implemented by transmitting the information as optical signals, typically in the form of packets of information, across the network. To take full advantage of the bandwidth, a need has arisen to extract and process information embedded in the signals, such as packet routing information, wholly in the optical domain. This has led the applicant to appreciate that there is a need to develop new and innovative optical logic circuits for use in these systems, including optical comparators.

One known solution to the problem of providing an all optical N-bit comparator for use at ultra-high bandwidths is known from the paper presented by J. M. Martinez et al in the journal IEEE Photonics Technology Letters, Vol. 18 (2006), No. 1, pp. 151-153. This teaches a cascade of SOA-MZI structures. With this approach there is a requirement for N SOA-MZI structures for comparing two N-bit numbers. Optical amplifiers are currently not as low cost to produce as their electronic counterparts, so this need for N structures can result in a relatively high cost circuit when the numbers have many bits (N greater than 6 or so).

An alternative prior art solution is taught in a paper presented by T. Yasui et al in the journal IEEE Journal of Lightwave Technology, Vol 24 (2006), No 2, pp. 723-733. This paper teaches a solution which exploits differential spin excitation in semiconductor multiple quantum wells.

An object of the invention is to provide a comparator which uses all optical components and which can have an architecture that can readily be scaled to cope with N bit numbers having a relatively high number of bits (N greater than 4 or so) without a significant associated cost or complexity increase.

SUMMARY OF THE INVENTION

According to a first aspect there is provided an optical comparator circuit which has first and second inputs nodes for receiving respective words A and B, each word comprising an N-bit Boolean word received at the input as a sequence of bits starting with the most significant bit and ending with the least significant bit, each bit of word A being received at the input at the same time as the corresponding bit of word B, the circuit comprising:

a first stage comprising an optical gate which receives the signals applied to the two inputs and produces at its output an N bit signal with each bit being representative of the logical expression A XOR B for a respective pair of bits of the words A and B, a second stage which comprises an optical gate having at least two inputs, a first input being connected to the output of the first stage by an optical connection having a first time delay, and a second input being connected to the output of the first stage through (N−1) further optical connections, each further connection having an associated time delay which is longer than the first time delay, the second stage providing at its output a signal comprising N bits, each bit corresponding to a respective bit of the signal output from the first stage at that time, and each bit having a first value if all of the inputs to the stage at that time are equal and a second value if and only if the first delayed input differs in value from all of the other delayed inputs, and a third stage which comprises an optical gate having two inputs, the first input being connected to the first input node of the circuit and the second input being connected to the output of the second stage, the output of the third stage comprising an N bit signal with each bit having a first value if the inputs at that time differ and a second value if the inputs at that time are the same, the presence of the second value in the output being indicative of word A being greater than word B.

The optical circuit will compare two N-bit numbers and provide an output from the third stage which indicative of the function A>B and may easily be scaled by varying the number of further delayed input optical paths to the second stage.

The first stage may comprise an optical XOR gate.

The second stage may comprise an optical X AND NOT Y gate or an optical AND gate preceded by a NOT gate at one of its inputs. In the case of the X AND NOT Y gate, the first signal may be the Y input. In the case of an AND gate, the further delayed inputs may be the ones that are inverted and the first input may be non-inverted.

The third stage may comprise an optical AND gate, or more preferably an X AND NOT Y gate preceded by a NOT gate at the Y input. The input which receives the output from the second stage is preferably the one that is inverted.

The skilled man will understand that by optical logic gate we mean a logic gate which takes optical input signals and produces an optical output signal without converting the optical signal into an electronic signal as an intermediate step. This feature enables the circuit to operate at very high bit rates.

The circuit may include means for applying the words A, B to the input nodes with each bit of the word arriving at a temporal spacing from the previous and subsequent bit of the word, the spacing being equal to the difference between the first and second time delays. This spacing may be set by a clock pulse train which can be applied to all of the optical gates for synchronisation.

The first delay time is preferably zero seconds, or as short a delay as possible. All optical connections have some associated time delay so a zero delay in practice may be impossible to achieve.

Each of the further delayed inputs to the second stage may have a delay that is a unique multiple of the clock frequency plus the first delay. Hence if the first delay is zero, the further delays will be multiples of the clock frequency. Thus, for N=4, there will be 3 further delay lines fed to the second stage, with a delay time equal to one clock beat, two clock beats and three clock beats respectively. The circuit will produce 4 output signals from the third stage as the input words A and B ripple through.

In a modification, the input words may arrive with a bit spacing of 2 clock beats, and the further delays will be multiples of 2 clock beats. This allows a spare beat between each output of the AND gate, giving the gate time to reset. Longer spaces could be used, but excessively long spaces will reduce the maximum bandwidth that can be provided by the circuit.

The circuit may include a fourth stage which comprises a further AND gate having two inputs, the first input being connected to the second input node of the circuit and the second input being connected to the output of the second stage. This will provide at its output the function B>A.

The circuit may further include a fifth stage which comprises an optical logical OR gate which receives as its input all of the N signal bits output from the third and fourth stage simultaneously and provides at its output a signal representing the function NOT (A=B). Of course, if required this function could be obtained directly by monitoring the output of the second stage.

The inputs to the second stage gate may be fed from optical connections having time delays chosen so that the bit of the word present at the input node that is fed to the NAND gate is the same bit as that passed through the first and second stages to produce the output of the second stage that is also fed to the third stage.

The delayed further inputs to the second stage AND gate may each be inverted whilst the first input to that gate is not inverted.

The optical circuit may comprise optical logic gates formed from a logical element comprising a SOA to which two input signals, X and Y, to be processed are fed and which, through the exploitation of cross gain modulation effects, XGM, provides as its output a signal representing the function (X AND NOT Y). This gate is preferably configured so as to provide each of the different types of Boolean functions required by the circuit.

The AND gate of the third stage can be implemented using one X AND NOT Y gate with the signal fed to the Y input being inverted by passing it through a NOT gate to give the function X AND Y. The NOT gate of the third stage can also be performed from the same SOA building block X AND NOT Y but fed with only one input signal and a clock signal as the other input. The XOR gate of the first stage can be implemented using two X AND NOT Y gates whose outputs are simultaneously fed to an OR gate. The OR gate may simply comprise an optical fibre coupler. The complete circuit may therefore comprises six X AND NOT Y gates.

The SOA may comprise a two ended device with one of the input signals being applied to a first end and the other signal to its second end along with a counter wave signal CW, the output being taken from the first end of the device. The input signal applied with the counter wave signal may have a lower power than the other input signal. The high power signal should have enough power to saturate the SOA when in its logical high state, but not in its low state.

The first, second and third and fourth stages may consist in total of only six identical optical logic gates connected by optical connections to give the different required functions and a number of optical delay lines, the logic gates each consisting of only a single SOA, rather than multiple SOAs. Each logic gate may be identical to the other logic gates. This makes the circuit well suited to implementation as an integrated circuit.

According to a second aspect there is provided a method of performing a comparison of two N-bit optical signals A, B where N is greater than 1, comprising performing the following steps:

comparing corresponding bits of each word to produce an identity indicator bit having a first state indicating that the bits are the same and a second state indicting that the bits are different;

passing the identity indicator bit directly to a first input of a first AND gate;

passing delayed versions of the identity indicator bit through inverters to (N−1) successive inputs of the first AND gate;

passing the output from the first AND gate a first input of a second AND gate and passing the input bit of word A to a second input of the second AND gate; and monitoring the optical signal output of the second AND gate for each of the bits to identify whether A>B.

The method may further comprise additional steps of repeating the method steps for all bits of the N-bit word until the LSB of A and B are compared. This allows words of greater than 2 bits in length to be compared (N>2). The step steps may be repeated N−1 times.

The method may comprise an additional step of passing each output of the first AND gate to a first input of a third AND gate which receives at its other input the corresponding bit of word B compared in the comparing step. This step provides as its output a signal indicative of B>A. Again this step may be repeated N times, once for each bit of words A and B that are compared.

The method may further comprise passing all of the N outputs from each of the second and third AND gates to an OR gate, the output of which provides a signal representing the function NOT (A=B).

According to a third aspect there is provided an all optical comparator which is arranged to compare two N-bit words and provide as an output at least one of the following Boolean functions: A>B, A<B and NOT (A=B), in which the comparator comprises a plurality of logic elements which each comprise at least one semiconductor optical amplifier.

The semiconductor optical amplifier which two input signals, X and Y, to be processed are fed and which, through the exploitation of cross gain modulation effects, XGM, provides as its output a signal representing the function (X AND NOT Y).

The comparator may include six such logic elements.
The comparator may compare word of length N>1.

LIST OF FIGURES

There will now be described by way of example only one embodiment of the present invention with reference to and as illustrated in the accompanying drawings of which.

BRIEF DESCRIPTION OF THE INVENTION

Figure 1:
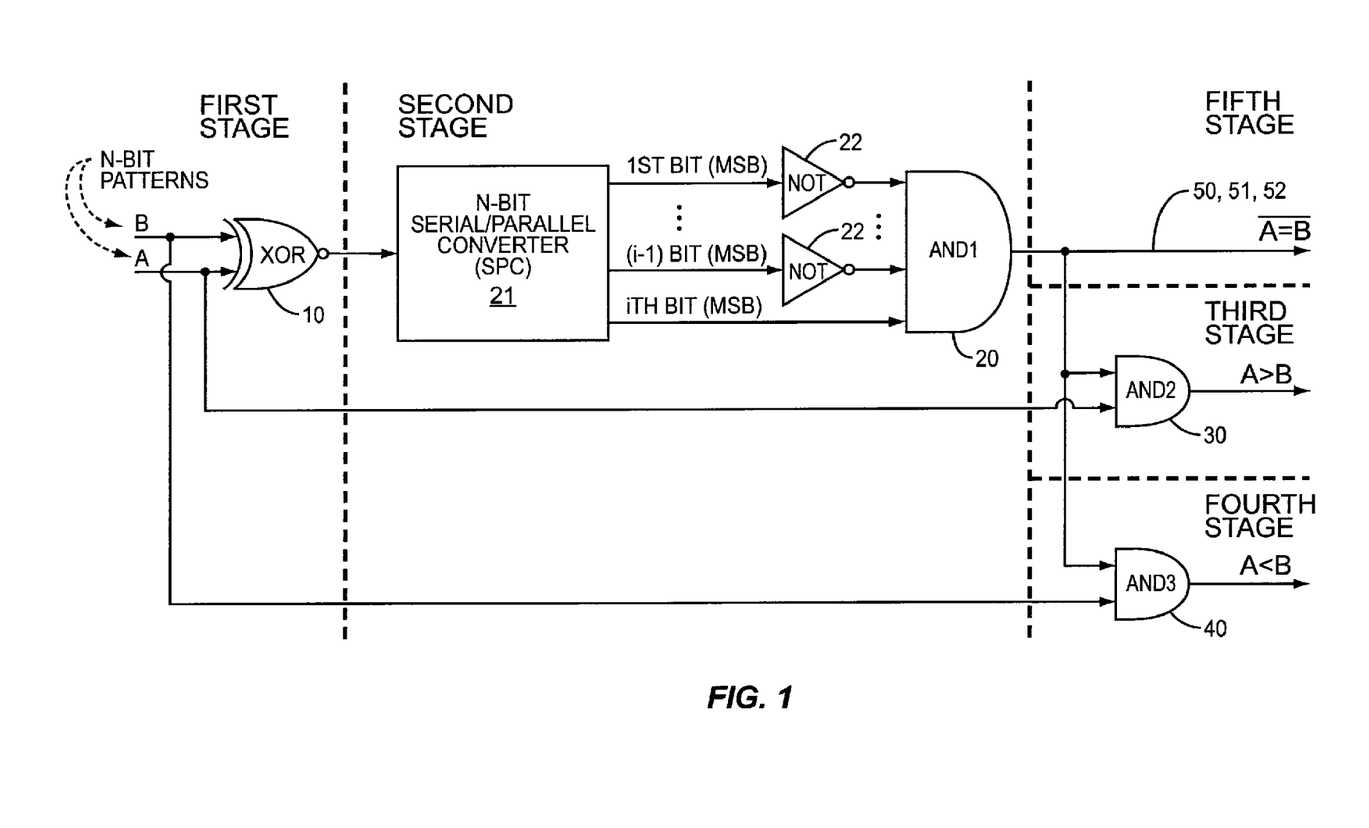
FIG. 1 is an overview of an optical logical comparator for comparing two N-bit words, where N is greater than 1.

An all optical N-bit comparator is shown in FIG. 1. The comparator receives as its input a pair of N-bit words $A_k$ and $B_k$ where k=1 ... N. The comparator comprises a combination of optical logic gates and delay lines which together provide as an output the logical functions A>B, A<B and NOT (A=B).

The first stage of the optical circuit is an XOR gate 10 to which each pair of corresponding bits $A_k$, $B_k$ of the signals A, B are passed in sequence. By this we mean that at a first instance the most significant bits $A_n$ and $B_n$ are input to the comparator to give a first output bit, then the next most significant bits $A_{n-1}$, $B_{n-1}$ to give the next output bit and so on until the least significant bits $A_{k=1}$, $B_{k=1}$ are passed to the XOR gate to give the last bit of the output. There will therefore be an N bit word produced with one bit being produced at any given time.

If two bits $A_k$, $B_k$ passed to the XOR gate 10 are the same, then the output bit of the XOR gate that corresponds to those bits will be logic 0. It will be logic 1 if, and only if, the bits A and B are different. For any given pair of N bit words there will therefore be a corresponding N bit word produced with a 1 for each pair of bits that do not match and a 0 for each pair that do match. It should be noted that this output word does not provide any information indicative of which of the words A, B is largest.

The next stage of the comparator circuit is an AND gate 20, which is provided with 2 inputs supplied from an N-bit serial to parallel converter 21. The serial to parallel converter 21 in fact comprises merely a set of N optical connections, the first of which has zero introduced time delay, and the others have time delays which are different multiples of the time between samples arriving at the XOR gate. Coils of optical fibre could be used to provide the required time delays. The delays are typically sequential integer multiples of the clock rate. Hence with a clock giving one nsec. between beats, and for words of length N=6 the first line will have multiple M=0 times the clock rate, the next M=1 times and so on until the Nth line has a delay equal to M=N−1 nseconds.

The first input to the AND gate 20 is connected to the output of the XOR gate through the zero delay time optical connection of the SPC 21. The second input is also connected to the output of the XOR gate but this time through a set of N−1 inverters 22 respectively associated with each of the N−1 delayed time lines of the serial to parallel converter 21. The signals to the second input are therefore delayed and inverted versions of the signals out of the XOR gate 10.

Thus, as the first output bit of the XOR gate is produced it is passed to the first input of the AND gate. At this time no signals are applied to the other inputs to the AND gate (since there are no previous delayed signals to be presented) so the output of the AND gate will be 0. As the next bit is output from the XOR gate it is applied to the first input to the AND gate, and by this time the first bit will have rippled through to the second input of the AND gate. Because one of the inputs is inverted and the other not, the output of the AND gate will be 1 if the two inputs to the AND gate do not match (being the first input 1) and 0 if they do. This process is then repeated for each of the N bits of the words A and B, giving an N bit output signal from the AND gate. Note that as soon as one pair of inputs to the AND gate do not match then the output of the AND gate for all subsequent samples will always be 0 for the rest of that word.

To determine whether A>B, each output from the AND gate of the second stage is next passed to a third stage. This comprises a second AND gate 30. The $k^{th}$ bit of word A is fed to one input of the AND gate along with the $k^{th}$ bit output from the second stage. If the $k^{th}$ bit of A is 1, and the $k^{th}$ output of the first AND gate is 1, then this indicates that A>B. If they do not match, then A is either equal to B or less than B.

To determine whether A<B, each output from the AND gate is also coupled to a fourth stage which also comprises an AND gate 40. This time it is the $k^{th}$ bit of B which will be fed to one input of the AND gate along with the $k^{th}$ output from the second stage. If the $k^{th}$ bit of B is 1, and the output of the fourth stage is 1, then this indicates that A<B. If they do not match, then A is either equal to B or greater than B.

Having determined both A<B and A>B the outputs of the third and fourth stages can then be coupled to a fifth stage comprising an OR gate 50 to determine whether A=B. In this case, all of the bits of the words output from the third and fourth stages should be fed to the OR gate simultaneously. This may require a series to parallel converter 51, 52 as shown for each of the outputs from the third and fourth stages. This may again comprise a set of N−1 delay lines and one not-delayed line. In practice all of the lines can be delayed as long as the difference in delay for each line is correct. Alternatively, this function could be obtained by directly monitoring the output of the second stage. This later alternative is the one illustrated in FIG. 3.

Note that in place of the various AND gates, a gate performing the function X AND NOT Y can be used if the Y input is previously inverted. As will be shown, such a gate can also be used as a building block for producing the XOR gate and the NOT gates.

Figure 2:
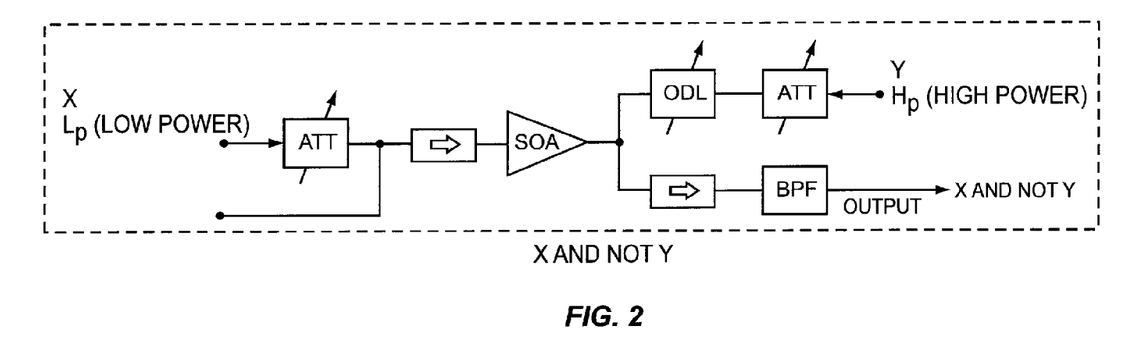
FIG. 2 is a schematic illustration of an optical gate that can be used as a building block to implement the comparator of FIG. 1.

A practical embodiment of the comparator of FIG. 1 can be realised using a set of six semiconductor optical amplifiers (SOA's) configured to provide logical building blocks or logic gates. A suitable gate which provides the functionality (XANDNOTY) is shown in FIG. 2.

Each building block for a gate comprises a single semiconductor optical amplifier (SOA) having a first input at one end and a second input at the other. The output from the amplifier is taken to be the signal that passes out of the second end of the amplifier. A characteristic of SOA's is that a gain is applied to an input signal which is influenced by the power of the signals input to the amplifier. As the input power increases the gain eventually starts to decrease. A further characteristic is that SOA's are non-linear devices, a signal at one wavelength being able to modulate a signal at another or at the same wavelength through the well known process of cross gain modulation (XGM).

Coupled to the first end of the amplifier is a continuous wave signal CW of relatively high power and a first, lower power, input signal Lp. Coupled to the second end is a second, high power, input signal Hp. The two input signals have the same wavelength but the CW is at a different wavelength.

Figure 4:
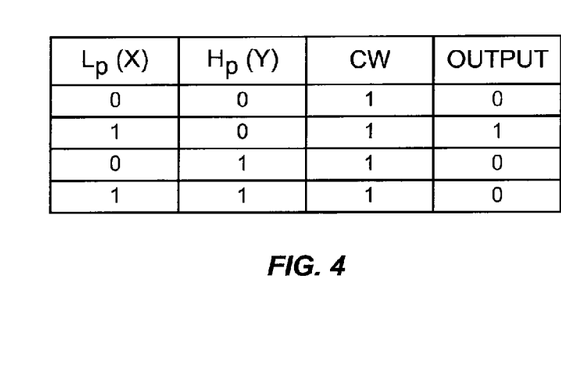
FIG. 4 is a truth table for the logic gate of FIG. 2.

The two counterpropogating input signals interact in the SOA so that the low power signal Lp experiences the gain modulation induced by the stronger second input signal HP. The CW signal helps to keep the SOA saturation high, thus reducing the SOA recovery time. In effect this means that with no high power signal applied (Hp=0) the output will be 1 when Lp=1 and 0 when Lp=0. On the other hand, when the high power signal Hp=1 is applied, the low power signal Lp experiences a strongly reduced SOA gain, giving an output of 0 at all times. The output from the gate therefore corresponds to the function (Lp AND NOT Hp). This is shown in the truth table of FIG. 4 of the accompanying drawings.

Figure 3:
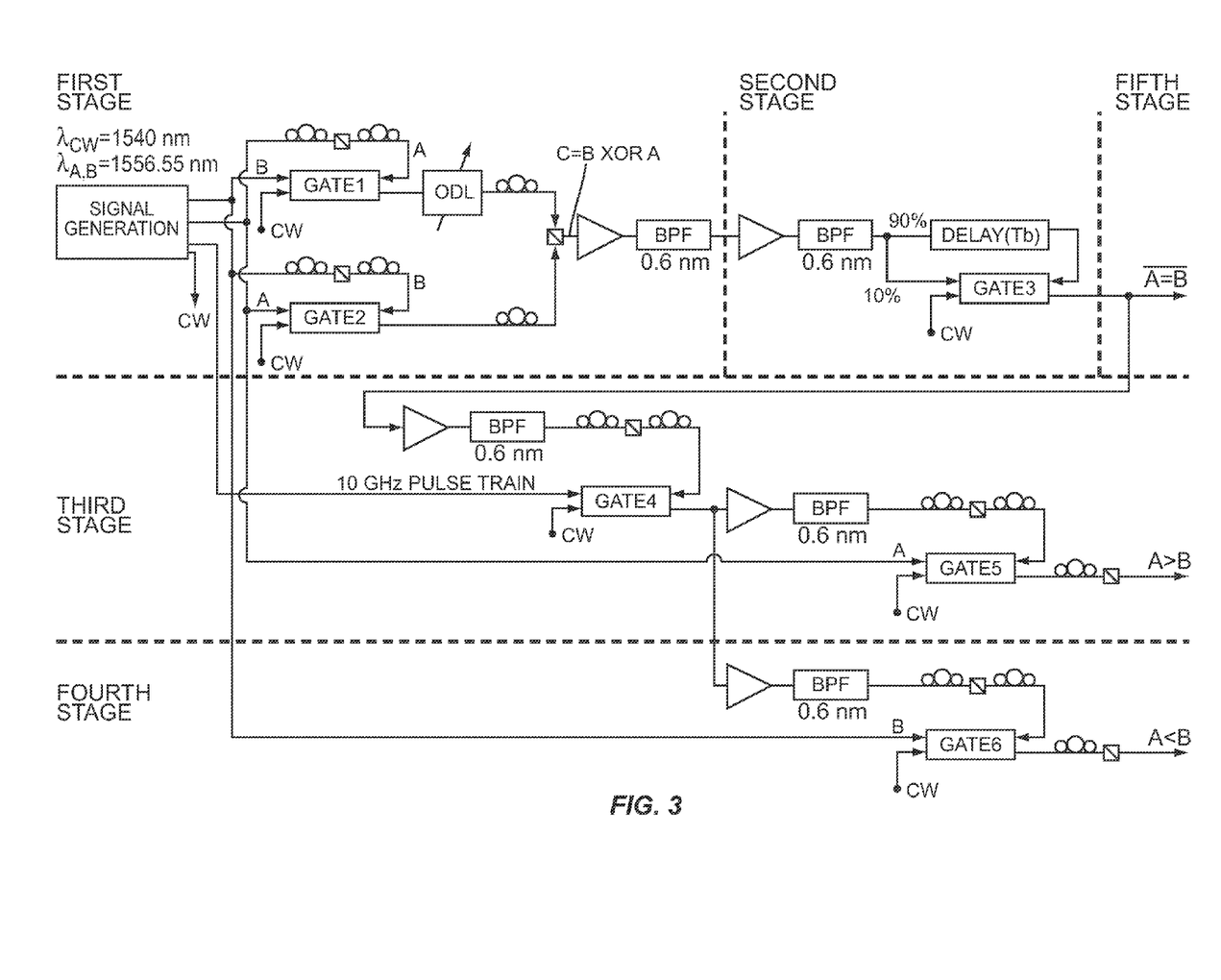
FIG. 3 is a detailed view of an embodiment of an optical circuit in accordance with the first aspect of the invention which functions in accordance with the overview of FIG. 1.

Turning to FIG. 3, six gates as shown in FIG. 2 can be connected into a circuit which takes the two N-bit numbers as its input and provides outputs for A>B, A<B and NOT (A=B). The gates can be identical which eases the design burden.

The first part of the circuit of FIG. 1—the XOR gate—is implemented by passing signals A and B to the first and second inputs of a first gate (gate 1) to give an output corresponding to the logical function (A AND NOT B). The same signals are also fed the other way round (to the second and first inputs respectively) to a second gate (gate 2) to give an output corresponding to the function (B AND NOT A). The output of the two gates are then combined using a fibre coupler tail (to give an OR function) so as to provide the function (A AND NOT B) OR (B AND NOT A) which is the same as the function (A XOR B).

The output of the fibre coupler tail is next fed to the first input of a third gate (gate 3) and a delayed version of the same output fed to the second input of the third gate. In fact, for an N-bit word there will be N delayed versions fed to the second input, each delayed by one or more samples. Only one delayed input is shown in FIG. 3 for clarity. The output of the third gate will therefore represent the first AND gate function of the circuit of FIG. 1. Note that no additional inverters are needed in this case since the function of gate 3 inherently provides the required inversion of the second input.

The output from gate 3 is then passed to the second input of another gate, gate 4. A pulse train synchronised to the sample rate is fed to the first input of gate 4, so that the output of gate 4 is an inverted version of the signal fed to the second input of gate 4 (it is an inverted version of the signal out of gate 3).

The signal output from gate 4 is fed to the second input of gates 5 and 6 respectively. The first input of gate 5 is provided with An as its input and thus this gate gives as its output an indication of A>B. The first input of gate 6 is provided with Bn as its input and thus this gate gives as its output an indication of A<B.

The output from each gate can be passed though an amplifier as required before being fed to a subsequent gate, and may also be passed through a bandpass filter.

In an experimental arrangement to verify the operation of the circuit of FIG. 3, N bit signals A and B of wavelength 1556.55 nm were used with a continuous wave signal applied to each SOA of 1540 nm. Bandpass filters of 0.6 nm bandwidth were used to filter the outputs from each gate.

Figure 5:
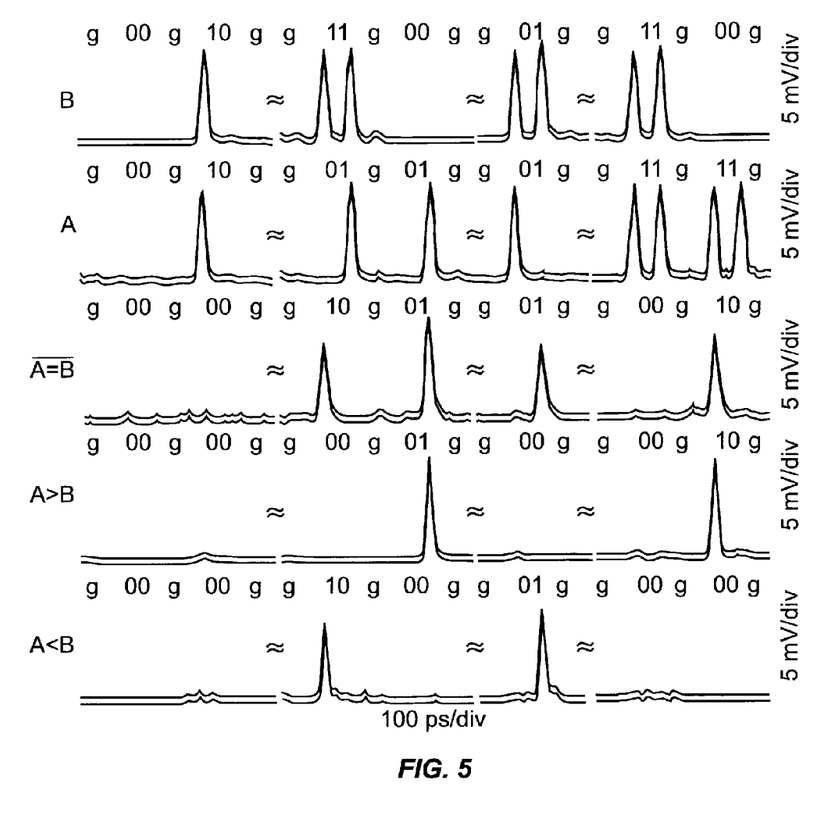
FIG. 5 illustrates a representative set of output patterns obtained from the circuit of FIG. 3 together with the input words A and B used.

FIG. 5 shows the output patterns NOT (A=B), A>B and A<B together with the corresponding input patterns B and A. The guard bit between two patterns is labelled as g. When A and B are matched, the output is 00 at all three outputs. If A is higher than B, the outputs A>B and NOT (A=B) become 1 as the first mismatch occurs. The other bit is 0. The same correct behaviour is observed also for A<B, thus demonstrating the scheme works properly.

Figure 6:
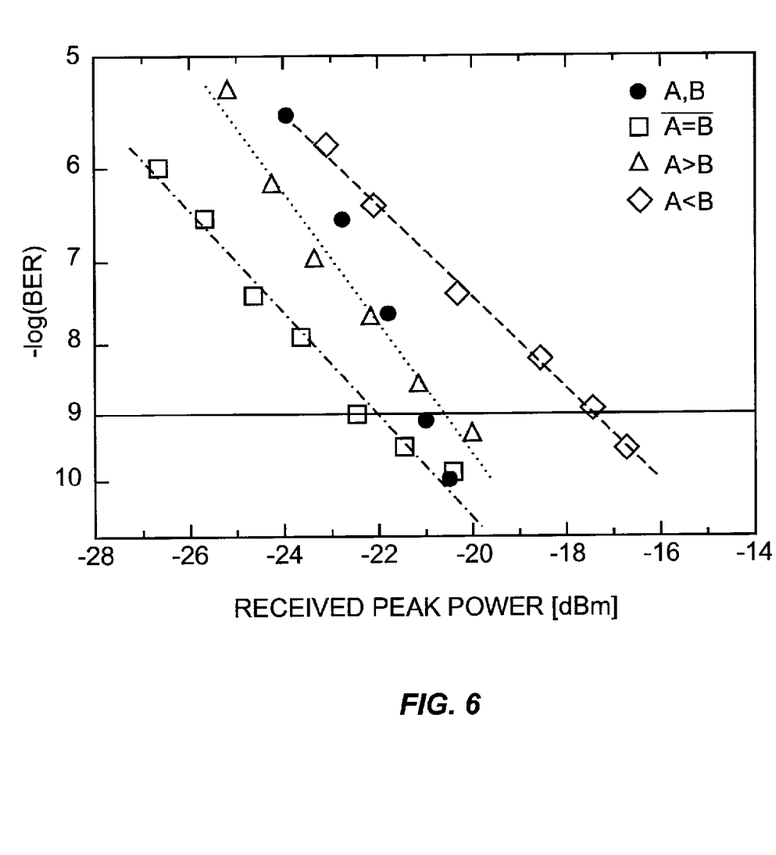
FIG. 6 plots BER against received peak power for A>B and A<B compared with the BER of the inputs A and B.

FIG. 6 summarises the performance in terms of BER as a function of the received peak power for the input and output signals. The measurements were performed with a pre-amplified receiver. Error-free operations are obtained for NOT (A=B), A>B and A<B.

The measured extinction ratio is higher than 8 dB for NOT(A=B), 8.6 dB for A>B and 8.4 dB for A<B. Since extinction ratio for the input patterns A and B is 9.9 dB, the maximum penalty introduced by the 2-bit comparator is 1.9 dB for NOT (A=B), 1.3 dB for A>B and 1.5 dB for A<B.

What is claimed is:

1. An optical comparator circuit which has first and second input nodes operative to receive respective words A and B as optical digital signals, each word comprising an N-bit Boolean word received at the input as a sequence of bits starting with the most significant bit and ending with the least significant bit, each bit of word A operative to be received at the input at the same time as the corresponding bit of word B, the circuit comprising:
  a first stage comprising an optical gate having two inputs, operative to receive the optical signals at the two inputs and further operative to output an N-bit optical signal wherein each bit represents the logical expression A XOR B for a respective pair of bits of the words A and B;
  a second stage comprising an optical gate having at least two inputs, a first input operative to be connected to the output of the first stage by an optical connection having a first time delay, and successive inputs operative to be connected to the output of the first stage through (N−1) further optical connections, each further connection having a different, associated time delay which is longer than the first time delay, the second stage operative to provide at its output a signal comprising N bits, each bit corresponding to a respective bit of the signal output from the first stage at that time, and each bit having a first value if all of the inputs to the second stage at that time are equal and a second value if and only if the first input differs in value from all of the successive inputs, and
  a third stage comprising an optical gate having two inputs, the first input operative to be connected to the first input node of the comparator circuit and the second input operative to be connected to the output of the second stage, the third stage operative to output an N-bit signal with each bit having a first value if the inputs at that time differ and a second value if the inputs at that time are the same, the presence of the second value in the output being indicative of word A being greater than word B.

2. The optical circuit of claim 1 wherein the first stage comprises an optical XOR gate, the second stage comprises a modified NAND function, and the third stage comprises an optical AND gate.

3. The optical circuit of claim 2 wherein the modified NAND function comprises a logical AND function of the first output of the first stage with a NAND function of (N−1) successive outputs of the first stage.

4. The optical circuit of claim 2 wherein the modified NAND function comprises an optical AND gate preceded by a NOT gate at each successive input other than the first.

5. The optical circuit of claim 2 in which the AND gate of the third stage is implemented as an X AND NOT Y gate preceded by a NOT gate at the Y input, which is connected to the output of the second stage.

6. The optical circuit of claim 2 wherein at least one optical logic gate comprises a semiconductor optical amplifier (SOA) to which two input signals, X and Y, to be processed are operative to be input and which, through the exploitation of cross gain modulation effects is operative to provide as its output an optical signal representing the function (X AND NOT Y).

7. The optical circuit of claim 6 wherein the AND gate of the third stage comprises one X AND NOT Y gate and one NOT gate, with any signal input to the Y input operative to be inverted by passing it through a NOT gate to yield the function X AND Y.

8. The optical circuit of claim 7 wherein the NOT gate comprises an X AND NOT Y logic gate operative with only one input signal and a clock signal as the other input.

9. The optical circuit of claim 7 wherein the modified NAND function of the second stage comprises one X AND NOT Y gate.

10. The optical circuit of claim 7 wherein the XOR gate of the first stage comprises two X AND NOT Y gates whose outputs are logically OR'ed to yield the XOR function.

11. The optical circuit of claim 10 wherein the outputs of the two X AND NOT Y gates are operative to be connected to an optical fiber coupler.

12. The optical circuit of claim 6 wherein each SOA logic gate comprises a two-ended device with one of the input signals operative to be applied to a first end and the other signal to its second end along with a counter wave signal CW, the output being taken from the first end of the device.

13. The optical circuit of claim 1 wherein the words A, B are operative to be applied to the input nodes with the bits of the words temporally spaced apart, the spacing set by a clock pulse train.

14. The optical circuit of claim 13 in which the first delay time is approximately zero and each of the further delayed inputs to the second stage has a delay that is a unique multiple of the clock frequency plus the first delay.

15. The optical circuit of claim 1 further comprising a fourth stage comprising an optical gate having two inputs, the first input operative to be connected to the second input node of the comparator circuit and the second input operative to be connected to the output of the second stage, the third stage operative to output an N-bit signal with each bit having a first value if the inputs at that time differ and a second value if the inputs at that time are the same, the presence of the second value in the output being indicative of word B being greater than word A.

16. The optical circuit of claim 15 further comprising a fifth stage comprising an optical logical OR gate operative to receive as input all of the N-bit signals output from the third and fourth stages simultaneously and further operative to output a signal representing the function NOT (A=B).

17. The optical circuit of claim 1 wherein the output of the second stage is operative to indicate the logical function NOT (A=B).

18. A method of performing an optical comparison of two N-bit optical signals A, B where N is greater than 1, comprising:
    comparing corresponding bits of each word to produce an identity indicator bit having a first state indicating that the bits are the same and a second state indicting that the bits are different;
    passing the identity indicator bit directly to a first input of a first AND gate;
    passing delayed versions of the identity indicator bit through inverters to (N−1) successive inputs of the first AND gate;
    passing the output from the first AND gate a first input of a second AND gate and passing the input bit of word A to a second input of the second AND gate; and
    monitoring the optical signal output of the second AND gate for each of the bits to identify whether A>B.

19. The method of claim 18 further comprising repeating the method steps (N−1) times, until the LSB of A and B are compared.

20. The method of claim 18 further comprising:
    passing the output from the first AND gate a first input of a third AND gate and passing the input bit of word B to a second input of the third AND gate; and
    monitoring the optical signal output of the third AND gate for each of the bits to identify whether B>A.

21. The method of claim 20 further comprising:
    performing a logical OR function on all of the N outputs from the second and third AND gates; and
    monitoring the output of the logical OR function for each of the bits to identify the function NOT(A=B).

* * * * *

UNITED STATES PATENT AND TRADEMARK OFFICE
CERTIFICATE OF CORRECTION

| | | |
|---|---|---|
| PATENT NO. | : 7,869,107 B2 | Page 1 of 1 |
| APPLICATION NO. | : 12/183662 | |
| DATED | : January 11, 2011 | |
| INVENTOR(S) | : Bogoni et al. | |

It is certified that error appears in the above-identified patent and that said Letters Patent is hereby corrected as shown below:

On the Face Page, in Field (56), under "OTHER PUBLICATIONS", in Column 2, Line 2, delete "and, NOR" and insert -- AND, NOR --, therefor.

In Column 2, Line 10, delete "Vol 24" and insert -- Vol. 24 --, therefor.

In Column 5, Line 7, delete "LIST OF FIGURES" and insert -- BRIEF DESCRIPTION OF THE FIGURES --, therefor.

In Column 5, Line 27, delete "BRIEF" and insert -- DETAILED --, therefor.

In Column 6, Line 59, delete "(XANDNOTY)" and insert -- (X AND NOT Y) --, therefor.

In Column 7, Line 54, delete "An" and insert -- $A_n$ --, therefor.

In Column 7, Line 56, delete "Bn" and insert -- $B_n$ --, therefor.

Signed and Sealed this
Seventeenth Day of May, 2011

David J. Kappos
*Director of the United States Patent and Trademark Office*